(12) United States Patent
Graber et al.

(10) Patent No.: US 7,750,642 B2
(45) Date of Patent: Jul. 6, 2010

(54) MAGNETIC FLOWMETER WITH VERIFICATION

(75) Inventors: William F. Graber, Eden Prairie, MN (US); Scot R. Foss, Eden Prairie, MN (US); Robert K. Schulz, Excelsior, MN (US)

(73) Assignee: Rosemount Inc., Eden Prairie, MN (US)

( * ) Notice: Subject to any disclaimer, the term of this patent is extended or adjusted under 35 U.S.C. 154(b) by 313 days.

(21) Appl. No.: 11/863,566

(22) Filed: Sep. 28, 2007

(65) Prior Publication Data

US 2008/0078252 A1  Apr. 3, 2008

Related U.S. Application Data

(60) Provisional application No. 60/848,314, filed on Sep. 29, 2006.

(51) Int. Cl.
G01N 27/02 (2006.01)

(52) U.S. Cl. .................... 324/439; 73/861.12

(58) Field of Classification Search ................ 324/439; 73/861.08, 861.12, 152.18; 702/76
See application file for complete search history.

(56) References Cited

U.S. PATENT DOCUMENTS

| | | | | |
|---|---|---|---|---|
| 3,096,434 A | 7/1963 | King | ........................ | 235/151 |
| 3,404,264 A | 10/1968 | Kugler | ........................ | 235/194 |
| 3,468,164 A | 9/1969 | Sutherland | .................. | 73/343 |
| 3,590,370 A | 6/1971 | Fleischer | ..................... | 324/51 |
| 3,618,592 A | 11/1971 | Stewart | .................. | 128/2.05 R |
| 3,688,190 A | 8/1972 | Blum | ....................... | 324/61 R |
| 3,691,842 A | 9/1972 | Akeley | ..................... | 73/398 C |
| 3,701,280 A | 10/1972 | Stroman | ..................... | 73/194 |
| 3,849,637 A | 11/1974 | Caruso et al. | .............. | 235/151 |
| 3,855,858 A | 12/1974 | Cushing | ................. | 73/194 EM |
| 3,948,098 A | 4/1976 | Richardson et al. | ........ | 73/861.24 |
| 3,952,759 A | 4/1976 | Ottenstein | .................... | 137/12 |
| 3,973,184 A | 8/1976 | Raber | .......................... | 324/51 |

(Continued)

FOREIGN PATENT DOCUMENTS

CA  999950  11/1976

(Continued)

OTHER PUBLICATIONS

"Notification of Transmittal of the International Search Report and the Written Opinion" for corresponding application PCT/US2007/020993, dated Apr. 17, 2008.

(Continued)

*Primary Examiner*—Vincent Q Nguyen
(74) *Attorney, Agent, or Firm*—Westman, Champlin & Kelly, P.A.

(57) ABSTRACT

A magnetic flowmeter is provided including a magnetic flowtube arranged to receive a flow of process fluid. The magnetic flowtube includes a drive coil and at least one sense electrode. Measurement circuitry is coupled to the flowtube and is configured to provide a drive signal to the drive coil and measure flow of process fluid through the flow tube based upon an output from the sense electrode. A memory contains a stored value related to a nominal parameter of the flowtube. Verification circuitry is arranged to measure a parameter of the magnetic flowtube and responsively provide a verification output related to operation of the magnetic flowmeter based upon a comparison of the measured parameter and the stored value.

15 Claims, 4 Drawing Sheets

U.S. PATENT DOCUMENTS

| | | | |
|---|---|---|---|
| RE29,383 E | 9/1977 | Gallatin et al. | 137/14 |
| 4,058,975 A | 11/1977 | Gilbert et al. | 60/39.28 |
| 4,083,031 A | 4/1978 | Pharo, Jr. | 367/135 |
| 4,099,413 A | 7/1978 | Ohte et al. | 73/359 |
| 4,102,199 A | 7/1978 | Talpouras | 73/362 |
| 4,122,719 A | 10/1978 | Carlson et al. | 73/342 |
| 4,219,807 A | 8/1980 | Speck et al. | 340/664 |
| 4,249,164 A | 2/1981 | Tivy | 340/870.3 |
| 4,250,490 A | 2/1981 | Dahlke | 340/870.37 |
| 4,255,964 A | 3/1981 | Morison | 73/24.01 |
| 4,279,013 A | 7/1981 | Dahlke | 340/879.37 |
| 4,337,516 A | 6/1982 | Murphy et al. | 364/551 |
| 4,383,443 A | 5/1983 | Langdon | 73/290 |
| 4,390,321 A | 6/1983 | Langlois et al. | 417/15 |
| 4,399,824 A | 8/1983 | Davidson | 128/736 |
| 4,417,312 A | 11/1983 | Cronin et al. | 364/510 |
| 4,423,634 A | 1/1984 | Audenard et al. | 73/587 |
| 4,459,858 A | 7/1984 | Marsh | 73/861.12 |
| 4,463,612 A | 8/1984 | Thompson | 73/861.22 |
| 4,517,468 A | 5/1985 | Kemper et al. | 290/52 |
| 4,528,869 A | 7/1985 | Kubo et al. | 74/695 |
| 4,530,234 A | 7/1985 | Cullick et al. | 73/53 |
| 4,536,753 A | 8/1985 | Parker | 340/566 |
| 4,540,468 A | 9/1985 | Genco et al. | 162/49 |
| 4,545,258 A | 10/1985 | Coursolle | 73/861.22 |
| 4,571,689 A | 2/1986 | Hildebrand et al. | 364/481 |
| 4,575,678 A | 3/1986 | Hladky | 205/776 |
| 4,592,240 A | 6/1986 | McHale et al. | 73/861.22 |
| 4,598,251 A | 7/1986 | Wehrs | 328/140 |
| 4,630,265 A | 12/1986 | Sexton | 370/85 |
| 4,635,214 A | 1/1987 | Kasai et al. | 364/551 |
| 4,642,782 A | 2/1987 | Kemper et al. | 364/550 |
| 4,644,479 A | 2/1987 | Kemper et al. | 364/550 |
| 4,649,515 A | 3/1987 | Thompson et al. | 364/900 |
| 4,668,473 A | 5/1987 | Agarwal | 422/62 |
| 4,686,638 A | 8/1987 | Furuse | 364/558 |
| 4,696,191 A | 9/1987 | Claytor et al. | 73/600 |
| 4,705,212 A | 11/1987 | Miller et al. | 236/54 |
| 4,707,796 A | 11/1987 | Calabro et al. | 364/552 |
| 4,720,806 A | 1/1988 | Schippers et al. | 364/551 |
| 4,736,367 A | 4/1988 | Wroblewski et al. | 370/85 |
| 4,736,763 A | 4/1988 | Britton et al. | 137/10 |
| 4,741,215 A | 5/1988 | Bohn et al. | 73/861.12 |
| 4,758,308 A | 7/1988 | Carr | 162/263 |
| 4,777,585 A | 10/1988 | Kokawa et al. | 364/164 |
| 4,784,000 A * | 11/1988 | Gaertner | 73/861.12 |
| 4,807,151 A | 2/1989 | Citron | 364/510 |
| 4,818,994 A | 4/1989 | Orth et al. | 340/501 |
| 4,831,564 A | 5/1989 | Suga | 364/551.01 |
| 4,841,286 A | 6/1989 | Kummer | 340/653 |
| 4,853,693 A | 8/1989 | Eaton-Williams | |
| 4,866,628 A | 9/1989 | Natarajan | 700/102 |
| 4,873,655 A | 10/1989 | Kondraske | 364/553 |
| 4,907,167 A | 3/1990 | Skeirik | 364/500 |
| 4,924,418 A | 5/1990 | Backman et al. | 364/550 |
| 4,926,364 A | 5/1990 | Brotherton | 364/581 |
| 4,934,196 A | 6/1990 | Romano | 73/861.38 |
| 4,939,753 A | 7/1990 | Olson | 375/107 |
| 4,964,125 A | 10/1990 | Kim | 371/15.1 |
| 4,988,990 A | 1/1991 | Warrior | 340/25.5 |
| 4,992,965 A | 2/1991 | Holter et al. | 364/551.01 |
| 5,005,142 A | 4/1991 | Lipchak et al. | 364/550 |
| 5,019,760 A | 5/1991 | Chu et al. | 318/490 |
| 5,025,344 A | 6/1991 | Maly et al. | 361/88 |
| 5,043,862 A | 8/1991 | Takahashi et al. | 364/162 |
| 5,047,990 A | 9/1991 | Gafos et al. | 367/6 |
| 5,053,815 A | 10/1991 | Wendell | 355/208 |
| 5,057,774 A | 10/1991 | Verhelst et al. | 324/537 |
| 5,067,099 A | 11/1991 | McCown et al. | 364/550 |
| 5,081,598 A | 1/1992 | Bellows et al. | 364/550 |
| 5,089,979 A | 2/1992 | McEachern et al. | 364/571.04 |
| 5,089,984 A | 2/1992 | Struger et al. | 395/650 |
| 5,098,197 A | 3/1992 | Shepard et al. | 374/120 |
| 5,099,436 A | 3/1992 | McCown et al. | 364/550 |
| 5,103,409 A | 4/1992 | Shimizu et al. | 364/556 |
| 5,111,531 A | 5/1992 | Grayson et al. | 395/23 |
| 5,121,467 A | 6/1992 | Skeirik | 395/11 |
| 5,122,794 A | 6/1992 | Warrior | 340/825.2 |
| 5,122,976 A | 6/1992 | Bellows et al. | 364/550 |
| 5,128,625 A | 7/1992 | Yatsuzuka et al. | 327/557 |
| 5,130,936 A | 7/1992 | Sheppard et al. | 364/551.01 |
| 5,134,574 A | 7/1992 | Beaverstock et al. | 364/551.01 |
| 5,137,370 A | 8/1992 | McCulloch et al. | 374/173 |
| 5,142,612 A | 8/1992 | Skeirik | 395/11 |
| 5,143,452 A | 9/1992 | Maxedon et al. | 374/170 |
| 5,148,378 A | 9/1992 | Shibayama et al. | 364/551.07 |
| 5,150,289 A | 9/1992 | Badavas | 364/154 |
| 5,167,009 A | 11/1992 | Skeirik | 395/27 |
| 5,175,678 A | 12/1992 | Frerichs et al. | 364/148 |
| 5,193,143 A | 3/1993 | Kaemmerer et al. | 395/51 |
| 5,197,114 A | 3/1993 | Skeirik | 395/22 |
| 5,197,328 A | 3/1993 | Fitzgerald | 73/168 |
| 5,212,765 A | 5/1993 | Skeirik | 395/11 |
| 5,214,582 A | 5/1993 | Gray | 364/424.03 |
| 5,216,226 A | 6/1993 | Miyoshi | 219/497 |
| 5,224,203 A | 6/1993 | Skeirik | 395/22 |
| 5,228,780 A | 7/1993 | Shepard et al. | 374/175 |
| 5,235,527 A | 8/1993 | Ogawa et al. | 364/571.05 |
| 5,265,031 A | 11/1993 | Malczewski | 364/497 |
| 5,265,222 A | 11/1993 | Nishiya et al. | 395/3 |
| 5,269,311 A | 12/1993 | Kirchner et al. | 128/672 |
| 5,274,572 A | 12/1993 | O'Neill et al. | 364/550 |
| 5,282,131 A | 1/1994 | Rudd et al. | 364/164 |
| 5,282,261 A | 1/1994 | Skeirik | 395/22 |
| 5,293,585 A | 3/1994 | Morita | 395/52 |
| 5,297,425 A * | 3/1994 | Hamby et al. | 73/152.18 |
| 5,303,181 A | 4/1994 | Stockton | 365/96 |
| 5,305,230 A | 4/1994 | Matsumoto et al. | 364/495 |
| 5,311,421 A | 5/1994 | Nomura et al. | 364/157 |
| 5,317,520 A | 5/1994 | Castle | 364/482 |
| 5,327,357 A | 7/1994 | Feinstein et al. | 364/502 |
| 5,333,240 A | 7/1994 | Matsumoto et al. | 395/23 |
| 5,337,367 A | 8/1994 | Maeda | 381/94 |
| 5,339,335 A | 8/1994 | Molnar | 702/193 |
| 5,340,271 A | 8/1994 | Freeman et al. | 415/1 |
| 5,347,843 A | 9/1994 | Orr et al. | 73/3 |
| 5,349,541 A | 9/1994 | Alexandro, Jr. et al. | 364/578 |
| 5,357,449 A | 10/1994 | Oh | 364/551.01 |
| 5,361,628 A | 11/1994 | Marko et al. | 73/116 |
| 5,365,423 A | 11/1994 | Chand | 364/140 |
| 5,365,787 A | 11/1994 | Hernandez et al. | 73/660 |
| 5,367,612 A | 11/1994 | Bozich et al. | 395/22 |
| 5,369,674 A | 11/1994 | Yokose et al. | 37/245 |
| 5,384,699 A | 1/1995 | Levy et al. | 364/413.13 |
| 5,386,373 A | 1/1995 | Keeler et al. | 364/577 |
| 5,388,465 A | 2/1995 | Okaniwa et al. | 73/861.17 |
| 5,392,293 A | 2/1995 | Hsue | 324/765 |
| 5,394,341 A | 2/1995 | Kepner | 364/551.01 |
| 5,394,543 A | 2/1995 | Hill et al. | 395/575 |
| 5,404,064 A | 4/1995 | Mermelstein et al. | 310/319 |
| 5,408,406 A | 4/1995 | Mathur et al. | 364/163 |
| 5,408,586 A | 4/1995 | Skeirik | 395/23 |
| 5,410,495 A | 4/1995 | Ramamurthi | 364/511.05 |
| 5,414,645 A | 5/1995 | Hirano | 364/551.01 |
| 5,416,593 A | 5/1995 | Vercruysse | 356/429 |
| 5,419,197 A | 5/1995 | Ogi et al. | 73/659 |
| 5,430,642 A | 7/1995 | Nakajima et al. | 364/148 |
| 5,434,774 A | 7/1995 | Seberger | 364/172 |
| 5,436,705 A | 7/1995 | Raj | 355/246 |
| 5,440,478 A | 8/1995 | Fisher et al. | 364/188 |
| 5,442,639 A | 8/1995 | Crowder et al. | 371/20.1 |
| 5,467,355 A | 11/1995 | Umeda et al. | 364/571.04 |
| 5,469,070 A | 11/1995 | Koluvek | 324/713 |
| 5,469,156 A | 11/1995 | Kogure | 340/870.38 |

| Patent | Date | Inventor | Class |
|---|---|---|---|
| 5,469,735 A | 11/1995 | Watanabe | 73/118.1 |
| 5,469,749 A | 11/1995 | Shimada et al. | 73/861.47 |
| 5,481,199 A | 1/1996 | Anderson et al. | 324/705 |
| 5,481,200 A | 1/1996 | Voegele et al. | 324/718 |
| 5,483,387 A | 1/1996 | Bauhahn et al. | 359/885 |
| 5,485,753 A | 1/1996 | Burns et al. | 73/720 |
| 5,486,996 A | 1/1996 | Samad et al. | 364/152 |
| 5,488,697 A | 1/1996 | Kaemmerer et al. | 395/51 |
| 5,489,831 A | 2/1996 | Harris | 318/701 |
| 5,495,769 A | 3/1996 | Broden et al. | 73/718 |
| 5,510,799 A | 4/1996 | Wishart | 340/870.3 |
| 5,511,004 A | 4/1996 | Dubost et al. | 364/551.01 |
| 5,526,293 A | 6/1996 | Mozumder et al. | 364/578 |
| 5,539,638 A | 7/1996 | Keeler et al. | 364/424.03 |
| 5,548,528 A | 8/1996 | Keeler et al. | 364/497 |
| 5,555,190 A | 9/1996 | Derby et al. | 364/510 |
| 5,560,246 A | 10/1996 | Bottinger et al. | 73/861.15 |
| 5,561,599 A | 10/1996 | Lu | 364/164 |
| 5,570,034 A | 10/1996 | Needham et al. | 324/763 |
| 5,570,300 A | 10/1996 | Henry et al. | 364/551.01 |
| 5,572,420 A | 11/1996 | Lu | 364/153 |
| 5,573,032 A | 11/1996 | Lenz et al. | 137/486 |
| 5,576,497 A | 11/1996 | Vignos et al. | 73/861.22 |
| 5,578,763 A | 11/1996 | Spencer et al. | 73/861.08 |
| 5,591,922 A | 1/1997 | Segeral et al. | 73/861.04 |
| 5,598,521 A | 1/1997 | Kilgore et al. | 395/326 |
| 5,600,148 A | 2/1997 | Cole et al. | 250/495.1 |
| 5,608,650 A | 3/1997 | McClendon et al. | 364/510 |
| 5,623,605 A | 4/1997 | Keshav et al. | 395/200.17 |
| 5,629,870 A | 5/1997 | Farag et al. | 364/551.01 |
| 5,633,809 A | 5/1997 | Wissenbach et al. | 364/510 |
| 5,637,802 A | 6/1997 | Frick et al. | 73/724 |
| 5,640,491 A | 6/1997 | Bhat et al. | 395/22 |
| 5,644,240 A | 7/1997 | Brugger | 324/439 |
| 5,654,869 A | 8/1997 | Ohi et al. | 361/540 |
| 5,661,668 A | 8/1997 | Yemini et al. | 364/550 |
| 5,665,899 A | 9/1997 | Willcox | 73/1.63 |
| 5,669,713 A | 9/1997 | Schwartz et al. | 374/1 |
| 5,671,335 A | 9/1997 | Davis et al. | 395/23 |
| 5,672,247 A | 9/1997 | Pangalos et al. | 162/65 |
| 5,675,504 A | 10/1997 | Serodes et al. | 364/496 |
| 5,675,724 A | 10/1997 | Beal et al. | 395/182.02 |
| 5,680,109 A | 10/1997 | Lowe et al. | 340/608 |
| 5,682,317 A | 10/1997 | Keeler et al. | 364/431.03 |
| 5,682,476 A | 10/1997 | Tapperson et al. | 370/225 |
| 5,700,090 A | 12/1997 | Eryurek | 374/210 |
| 5,703,575 A | 12/1997 | Kirkpatrick | 340/870.17 |
| 5,704,011 A | 12/1997 | Hansen et al. | 395/22 |
| 5,705,754 A | 1/1998 | Keita et al. | 73/861.357 |
| 5,705,978 A | 1/1998 | Frick et al. | 340/511 |
| 5,708,211 A | 1/1998 | Jepson et al. | 73/861.04 |
| 5,708,585 A | 1/1998 | Kushion | 364/431.061 |
| 5,710,370 A | 1/1998 | Shanahan et al. | 73/1.35 |
| 5,710,708 A | 1/1998 | Wiegand | 364/470.1 |
| 5,713,668 A | 2/1998 | Lunghofer et al. | 374/179 |
| 5,719,378 A | 2/1998 | Jackson, Jr. et al. | 219/497 |
| 5,731,522 A | 3/1998 | Sittler | 73/708 |
| 5,736,649 A | 4/1998 | Kawasaki et al. | 73/861.23 |
| 5,741,074 A | 4/1998 | Wang et al. | 374/185 |
| 5,742,845 A | 4/1998 | Wagner | 395/831 |
| 5,746,511 A | 5/1998 | Eryurek et al. | 374/2 |
| 5,747,701 A | 5/1998 | Marsh et al. | 73/861.23 |
| 5,752,008 A | 5/1998 | Bowling | 395/500 |
| 5,764,539 A | 6/1998 | Rani | 364/557 |
| 5,764,891 A | 6/1998 | Warrior | 395/200.2 |
| 5,781,024 A | 7/1998 | Blomberg et al. | 324/763 |
| 5,781,878 A | 7/1998 | Mizoguchi et al. | 701/109 |
| 5,790,413 A | 8/1998 | Bartusiak et al. | 364/485 |
| 5,796,006 A | 8/1998 | Bellet et al. | 73/661 |
| 5,801,689 A | 9/1998 | Huntsman | 345/329 |
| 5,805,442 A | 9/1998 | Crater et al. | 364/138 |
| 5,817,950 A | 10/1998 | Wiklund et al. | 73/861.66 |
| 5,825,664 A | 10/1998 | Warrior et al. | 700/7 |
| 5,828,567 A | 10/1998 | Eryurek et al. | 700/79 |
| 5,829,876 A | 11/1998 | Schwartz et al. | 374/1 |
| 5,848,383 A | 12/1998 | Yunus | 702/102 |
| 5,854,993 A | 12/1998 | Grichnik | 702/54 |
| 5,854,994 A | 12/1998 | Canada et al. | 702/56 |
| 5,859,964 A | 1/1999 | Wang et al. | 395/185.01 |
| 5,867,058 A | 2/1999 | DeCarlo, Jr. | 327/557 |
| 5,869,772 A | 2/1999 | Storer | 73/861.24 |
| 5,876,122 A | 3/1999 | Eryurek | 374/183 |
| 5,880,376 A | 3/1999 | Sai et al. | 73/861.08 |
| 5,887,978 A | 3/1999 | Lunghofer et al. | 374/179 |
| 5,908,990 A | 6/1999 | Cummings | 73/861.22 |
| 5,909,188 A | 6/1999 | Tetzlaff et al. | 341/155 |
| 5,923,557 A | 7/1999 | Eidson | 364/471.03 |
| 5,924,086 A | 7/1999 | Mathur et al. | 706/25 |
| 5,926,778 A | 7/1999 | Pöppel | 702/130 |
| 5,934,371 A | 8/1999 | Bussear et al. | 166/53 |
| 5,936,514 A | 8/1999 | Anderson et al. | 340/310.01 |
| 5,940,290 A | 8/1999 | Dixon | 364/138 |
| 5,956,663 A | 9/1999 | Eryurek et al. | 702/183 |
| 5,970,430 A | 10/1999 | Burns et al. | 702/122 |
| 5,995,910 A | 11/1999 | Discenzo | 702/56 |
| 6,002,952 A | 12/1999 | Diab et al. | 600/310 |
| 6,006,338 A | 12/1999 | Longsdorf et al. | 713/340 |
| 6,014,612 A | 1/2000 | Larson et al. | 702/183 |
| 6,014,902 A | 1/2000 | Lewis et al. | 73/861.12 |
| 6,016,523 A | 1/2000 | Zimmerman et al. | 710/63 |
| 6,016,706 A | 1/2000 | Yamamoto et al. | 9/6 |
| 6,017,143 A | 1/2000 | Eryurek et al. | 700/51 |
| 6,023,399 A | 2/2000 | Kogure | 361/23 |
| 6,026,352 A | 2/2000 | Burns et al. | 702/182 |
| 6,038,579 A | 3/2000 | Sekine | 708/400 |
| 6,045,260 A | 4/2000 | Schwartz et al. | 374/183 |
| 6,046,642 A | 4/2000 | Brayton et al. | 330/296 |
| 6,047,220 A | 4/2000 | Eryurek et al. | 700/28 |
| 6,047,222 A | 4/2000 | Burns et al. | 700/79 |
| 6,052,655 A | 4/2000 | Kobayashi et al. | 702/184 |
| 6,061,603 A | 5/2000 | Papadopoulos et al. | 700/83 |
| 6,072,150 A | 6/2000 | Sheffer | 219/121.83 |
| 6,094,600 A | 7/2000 | Sharpe, Jr. et al. | 700/19 |
| 6,112,131 A | 8/2000 | Ghorashi et al. | 700/142 |
| 6,119,047 A | 9/2000 | Eryurek et al. | 700/28 |
| 6,119,529 A | 9/2000 | Di Marco et al. | 73/861.68 |
| 6,139,180 A | 10/2000 | Usher et al. | 374/1 |
| 6,151,560 A | 11/2000 | Jones | 702/58 |
| 6,179,964 B1 | 1/2001 | Begemann et al. | 162/198 |
| 6,182,501 B1 | 2/2001 | Furuse et al. | 73/49.2 |
| 6,192,281 B1 | 2/2001 | Brown et al. | 700/2 |
| 6,195,591 B1 | 2/2001 | Nixon et al. | 700/2 |
| 6,199,018 B1 | 3/2001 | Quist et al. | 702/34 |
| 6,209,048 B1 | 3/2001 | Wolff | 710/62 |
| 6,236,948 B1 | 5/2001 | Eck et al. | 702/45 |
| 6,237,424 B1 | 5/2001 | Salmasi et al. | 73/861.17 |
| 6,260,004 B1 | 7/2001 | Hays et al. | 702/183 |
| 6,261,439 B1 | 7/2001 | Schwabe et al. | 205/725 |
| 6,263,487 B1 | 7/2001 | Stripf et al. | 717/1 |
| 6,272,438 B1 | 8/2001 | Cunningham et al. | 702/56 |
| 6,289,735 B1 | 9/2001 | Dister et al. | 73/579 |
| 6,298,377 B1 | 10/2001 | Hartikainen et al. | 709/223 |
| 6,307,483 B1 | 10/2001 | Westfield et al. | 340/870.11 |
| 6,311,136 B1 | 10/2001 | Henry et al. | 702/45 |
| 6,317,701 B1 | 11/2001 | Pyotsia et al. | 702/188 |
| 6,327,914 B1 | 12/2001 | Dutton | 73/861.356 |
| 6,330,525 B1 | 12/2001 | Hays et al. | 702/183 |
| 6,347,252 B1 | 2/2002 | Behr et al. | 700/2 |
| 6,356,191 B1 | 3/2002 | Kirkpatrick et al. | 340/501 |
| 6,360,277 B1 | 3/2002 | Ruckley et al. | 9/250 |
| 6,370,448 B1 | 4/2002 | Eryurek et al. | 700/282 |
| 6,377,859 B1 | 4/2002 | Brown et al. | 700/79 |
| 6,378,364 B1 | 4/2002 | Pelletier et al. | 73/152.47 |
| 6,396,426 B1 | 5/2002 | Balard et al. | 341/120 |
| 6,397,114 B1 | 5/2002 | Eryurek et al. | 700/51 |
| 6,405,099 B1 | 6/2002 | Nagai et al. | 700/159 |

| | | | | | | |
|---|---|---|---|---|---|---|
| 6,425,038 B1 | 7/2002 | Sprecher ..................... 710/269 | | DE | 19905071 A1 | 8/2000 |
| 6,434,504 B1 | 8/2002 | Eryurek et al. ............... 702/130 | | DE | 299 17 651 U1 | 12/2000 |
| 6,449,574 B1 | 9/2002 | Eryurek et al. ................. 702/99 | | DE | 199 47 129 | 4/2001 |
| 6,473,656 B1 | 10/2002 | Langels et al. ................. 700/17 | | DE | 100 36 971 A1 | 2/2002 |
| 6,473,710 B1 | 10/2002 | Eryurek ........................ 702/133 | | DE | 102 23 725 A1 | 4/2003 |
| 6,480,793 B1 | 11/2002 | Martin ............................ 702/45 | | DE | 102 55 698 A1 | 7/2004 |
| 6,492,921 B1 | 12/2002 | Kunitani et al. .............. 342/118 | | EP | 0 122 622 A1 | 10/1984 |
| 6,493,689 B2 | 12/2002 | Kotoulas et al. ............... 706/23 | | EP | 0 413 814 A1 | 2/1991 |
| 6,497,222 B2 | 12/2002 | Bolz et al. ................... 123/476 | | EP | 0 487 419 A2 | 5/1992 |
| 6,501,266 B1 | 12/2002 | Krivoi et al. ................. 324/238 | | EP | 0 512 794 A2 | 11/1992 |
| 6,505,517 B1 | 1/2003 | Eryurek et al. ............. 73/861.08 | | EP | 0 594 227 A1 | 4/1994 |
| 6,519,546 B1 | 2/2003 | Eryurek et al. ............... 702/130 | | EP | 0 624 847 A1 | 11/1994 |
| 6,532,392 B1 | 3/2003 | Eryurek et al. ................. 700/54 | | EP | 0 644 470 A2 | 3/1995 |
| 6,539,267 B1 | 3/2003 | Eruyrek et al. ................. 700/51 | | EP | 0 697 586 A2 | 2/1996 |
| 6,546,814 B1 | 4/2003 | Choe et al. ................ 73/862.08 | | EP | 0 749 057 A1 | 12/1996 |
| 6,556,145 B1 | 4/2003 | Kirkpatrick et al. .... 340/870.17 | | EP | 0 825 506 A2 | 7/1997 |
| 6,567,006 B1 | 5/2003 | Lander et al. ................. 340/605 | | EP | 0 827 096 A2 | 9/1997 |
| 6,594,603 B1 | 7/2003 | Eryurek et al. ............... 702/104 | | EP | 0 838 768 A2 | 9/1997 |
| 6,597,997 B2 | 7/2003 | Tingley .......................... 702/34 | | EP | 0 807 804 A2 | 11/1997 |
| 6,601,005 B1 | 7/2003 | Eryurek et al. ............... 702/104 | | EP | 1 058 093 A1 | 5/1999 |
| 6,611,775 B1 | 8/2003 | Coursolle et al. .............. 702/65 | | EP | 0 335 957131 | 11/1999 |
| 6,615,149 B1* | 9/2003 | Wehrs ........................... 702/76 | | EP | 1 022 626 A2 | 7/2000 |
| 6,654,697 B1 | 11/2003 | Eryurek et al. ................. 702/47 | | EP | 1 584 902 A1 | 2/2005 |
| 6,697,742 B1 | 2/2004 | Franklin et al. ................. 702/45 | | FR | 2 302 514 | 9/1976 |
| 6,701,274 B1 | 3/2004 | Eryurek et al. ............... 702/140 | | FR | 2 334 827 | 7/1977 |
| 6,727,812 B2 | 4/2004 | Sauler et al. ................... 340/511 | | GB | 928704 | 6/1963 |
| 6,751,560 B1 | 6/2004 | Tingley et al. ................. 702/51 | | GB | 1 534 280 | 11/1978 |
| 6,754,601 B1 | 6/2004 | Eryurek et al. ............... 702/104 | | GB | 1 534 288 | 11/1978 |
| 6,758,168 B2 | 7/2004 | Koskinen et al. ................. 122/7 | | GB | 2 310 346 A | 8/1997 |
| 6,859,755 B2 | 2/2005 | Eryurek et al. ............... 702/183 | | GB | 2 317 969 | 4/1998 |
| 6,904,476 B2 | 6/2005 | Hedtke ........................ 710/72 | | GB | 2 342 453 A | 4/2000 |
| 6,907,383 B2 | 6/2005 | Eryurek et al. ............... 702/183 | | GB | 2 347 232 A | 8/2000 |
| 6,915,364 B1 | 7/2005 | Christensen et al. ........ 710/104 | | JP | 56-031573 | 3/1981 |
| 6,920,799 B1 | 7/2005 | Schulz ..................... 73/861.52 | | JP | 57196619 | 2/1982 |
| 6,970,003 B2 | 11/2005 | Rome et al. .................. 324/718 | | JP | 58-129316 | 8/1983 |
| 7,018,800 B2 | 3/2006 | Huisenga et al. ................. 435/6 | | JP | 59-116811 | 7/1984 |
| 7,040,179 B2 | 5/2006 | Drahm et al. ........... 73/861.356 | | JP | 59-163520 | 9/1984 |
| 7,058,542 B2 | 6/2006 | Hauhia et al. ............... 702/183 | | JP | 59-176643 | 10/1984 |
| 7,085,610 B2 | 8/2006 | Eryurek et al. ................. 700/29 | | JP | 59-211196 | 11/1984 |
| 7,099,852 B2 | 8/2006 | Unsworth et al. ............. 706/23 | | JP | 60-000507 | 1/1985 |
| 7,171,281 B2 | 1/2007 | Weber et al. .................... 700/96 | | JP | 60-76619 | 5/1985 |
| 7,254,518 B2 | 8/2007 | Eryurek et al. ............... 702/183 | | JP | 60-131495 | 7/1985 |
| 2002/0013629 A1 | 1/2002 | Nixon et al. | | JP | 60-174915 | 9/1985 |
| 2002/0032544 A1 | 3/2002 | Reid et al. ................... 702/183 | | JP | 62-30915 | 2/1987 |
| 2002/0077711 A1 | 6/2002 | Nixon et al. .................... 700/19 | | JP | 62-080535 | 4/1987 |
| 2002/0121910 A1 | 9/2002 | Rome et al. .................. 324/718 | | JP | 62-50901 | 9/1987 |
| 2002/0145568 A1 | 10/2002 | Winter ......................... 343/701 | | JP | 63-169532 | 7/1988 |
| 2002/0148644 A1 | 10/2002 | Schultz et al. ................. 175/39 | | JP | 64-01914 | 1/1989 |
| 2002/0194547 A1 | 12/2002 | Christensen et al. .......... 714/43 | | JP | 64-72699 | 3/1989 |
| 2003/0033040 A1 | 2/2003 | Billings ........................ 700/97 | | JP | 11-87430 | 7/1989 |
| 2003/0045962 A1 | 3/2003 | Eryurek et al. | | JP | 2-05105 | 1/1990 |
| 2004/0128034 A1 | 7/2004 | Lenker et al. ................. 700/282 | | JP | 3-229124 | 10/1991 |
| 2004/0199361 A1 | 10/2004 | Lu et al. ..................... 702/183 | | JP | 4-70906 | 3/1992 |
| 2004/0249583 A1 | 12/2004 | Eryurek et al. ................. 702/47 | | JP | 5-122768 | 5/1993 |
| 2005/0072239 A1 | 4/2005 | Longsdorf et al. .............. 73/649 | | JP | 5-203761 | 8/1993 |
| 2006/0075009 A1 | 4/2006 | Lenz et al. ................... 708/160 | | JP | 6-95882 | 4/1994 |
| 2006/0095217 A1 | 5/2006 | Coursolle et al. .............. 702/49 | | JP | 06242192 | 9/1994 |
| 2006/0277000 A1 | 12/2006 | Wehrs ......................... 702/183 | | JP | 06-248224 | 10/1994 |
| 2007/0010968 A1 | 1/2007 | Longsdorf et al. .......... 702/183 | | JP | 7-063586 | 3/1995 |
| | | | | JP | 07234988 | 9/1995 |
| | FOREIGN PATENT DOCUMENTS | | | JP | 8-054923 | 2/1996 |
| | | | | JP | 8-102241 | 4/1996 |
| CA | | 1 300 924 | 8/1987 | JP | 08-114638 | 6/1996 |
| DE | | 32 13 866 A1 | 10/1983 | JP | 8-136386 | 6/1996 |
| DE | | 35 40 204 C1 | 9/1986 | JP | 8-166309 | 6/1996 |
| DE | | 40 08 560 A1 | 9/1990 | JP | 8-247076 | 9/1996 |
| DE | | 43 43 747 | 6/1994 | JP | 8-313466 | 11/1996 |
| DE | | 44 33 593 A1 | 6/1995 | JP | 2712625 | 10/1997 |
| DE | | 195 02 499 A1 | 8/1996 | JP | 2712701 | 10/1997 |
| DE | | 296 00 609 U1 | 3/1997 | JP | 2753592 | 3/1998 |
| DE | | 197 04 694 A1 | 8/1997 | JP | 07225530 | 5/1998 |
| DE | | 19930660 A1 | 7/1999 | JP | 10-232170 | 9/1998 |
| DE | | 199 05 071 | 8/2000 | JP | 59-211896 | 11/1998 |

| | | |
|---|---|---|
| JP | 11-083575 | 3/1999 |
| RU | 2190267 C2 | 9/2002 |
| WO | WO 94/25933 | 11/1994 |
| WO | WO 95/23361 | 8/1995 |
| WO | WO 96/11389 | 4/1996 |
| WO | WO 96/12993 | 5/1996 |
| WO | WO 96/39617 | 12/1996 |
| WO | WO 97/21157 | 6/1997 |
| WO | WO 97/25603 | 7/1997 |
| WO | WO 98/06024 | 2/1998 |
| WO | WO 98/13677 | 4/1998 |
| WO | WO 98/14855 | 4/1998 |
| WO | WO 98/20469 | 5/1998 |
| WO | WO 98/37391 | 8/1998 |
| WO | WO 98/39718 | 9/1998 |
| WO | WO 99/19782 | 4/1999 |
| WO | WO 00/41050 | 7/2000 |
| WO | WO 00/55700 | 9/2000 |
| WO | WO 00/70531 | 11/2000 |
| WO | WO 01/01213 A1 | 1/2001 |
| WO | WO 01/19440 | 3/2001 |
| WO | WO 01/77766 | 10/2001 |
| WO | WO 01/90704 A2 | 11/2001 |
| WO | WO 02/27418 | 4/2002 |
| WO | WO 03/081002 | 10/2003 |

OTHER PUBLICATIONS

U.S. Appl. No. 09/257,896, filed Feb. 25, 1999, Eryurek et al.
"A TCP\IP Tutorial" by, Socolofsky et al., Spider Systems Limited, Jan. 1991, pp. 1-23.
"Approval Standards for Explosionproof Electrical Equipment General Requirements", Factory Mutual Research, Cl. No. 3615, Mar. 1989, pp. 1-34.
"Approval Standard Intrinsically Safe Apparatus and Associated Apparatus For Use in Class I, II, and III, Division I Hazardous (Classified) Locations", Factory Mutual Research, Cl. No. 3610, Oct. 1988, pp. 1-70.
"Automation On-line" by, Phillips et al., Plant Services, Jul. 1997, pp. 41-45.
"Climb to New Heights by Controlling your PLCs Over the Internet" by, Phillips et al., Intech, Aug. 1998, pp. 50-51.
"Ethernet emerges as viable, inexpensive fieldbus", Paul G. Schreier, Personal Engineering Dec. 1997, p. 23-29.
"Ethernet Rules Closed-loop System" by, Eidson et al., Intech, Jun. 1998, pp. 39-42.
"Fieldbus Standard for Use in Industrial Control Systems Part 2: Physical Layer Specification and Service Definition", ISA-S50.02-1992, pp. 1-93.
"Fieldbus Standard for Use in Industrial Control Systems Part 3: Data Link Service Definition", ISA-S50.02-1997, Part 3, Aug. 1997, pp. 1-159.
Fieldbus Standard for Use in Industrial Control Systems Part 4: Data Link Protocol Specification, ISA-S50.02-1997, Part 4, Aug. 1997, pp. 1-148.
"Fieldbus Support for Process Analysis" by, Blevins et al., Fisher-Rosemount Systems, Inc., 1995, pp, 121-128.
"Fieldbus Technical Overview Understanding Foundation™ fieldbus technology", Fisher-Rosemount, 1998, pp. 1-23.
"Hypertext Transfer Protocol—HTTP/1.0" by, Berners-Lee et al., MIT/LCS, May 1996, pp. 1-54.
"Infranets, Intranets, and the Internet" by, Pradip Madan, Echelon Corp. Sensors, Mar. 1997, pp. 46-50.
"Internet Protocol Darpa Internet Program Protocol Specification" by, Information Sciences Institute, University of Southern California, RFC 791, Sep. 1981, pp, 1-43.
"Introduction to Emit", emWare, Inc., 1997, pp. 1-22.
"Introduction to the Internet Protocols" by, Charles L Hedrick, Computer Science Facilities Group, Rutgers University, Oct. 3, 1988, pp. 1-97.
"Is There A Future for Ethernet in Industrial Control?", Miclot et al., Plant Engineering Oct. 1988, pp. 44-46,48, 50.

LFM/SIMA Internet Remote Diagnostics Research Project Summary Report, Stanford University, Jan. 23, 1997, pp, 1-6.
"Managing Devices with the Web" by, Howard et al., Byte, Sep. 1997, pp. 45-64.
"PC Software Gets Its Edge From Windows, Components, and the Internet", Wayne Labs, I&CS, Mar. 1997, pp. 23-32.
Proceedings Sensor Expo, Aneheim, California, Produced by Expocon Managemnet Associates, Inc., Apr. 1996,pp. 9-21.
Proceedings Sensor Expo, Boston, Massachuttes, Produced by Expocon Management Associates, Inc., May 1997, pp. 1-416.
"Smart Sensor Network of the Future" by, Jay Warrior, Sensors, Mar. 1997, pp. 40-45.
"The Embedded Web Site" by, John R Hines, IEEE Spectrum, Sep. 1996, p. 23.
"Transmission Control Protocol: Darpa Internet Program Protocol Specification" Information Sciences Institute, Sep. 1981, pp. 1-69.
"On-Line Statistical Process Control for a Glass Tank Ingredient Scale," by R.A. Weisman, *IFAC real Time Programming*, 1985, pp. 29-38.
"The Performance of Control Charts for Monitoring Process Variation," by C. Lowry et al., *Commun. Statis.—Simula.*, 1995, pp. 409-437.
"A Knowledge-Based Approach for Detection and Diagnosis of Out-Of-Control Events in Manufacturing Processes," by P. Love et al., *IEEE*, 1989, pp. 736-741.
"Advanced Engine Diagnostics Using Universal Process Modeling", by P. O'Sullivan, *Presented at the 1996 SAE Conference on Future Transportation Technology*, pp. 1-9.
"Programmable Hardware Architectures for Sensor Validation", by M.P. Henry et al., *Control Eng. Practice*, vol. 4, No. 10, pp. 1339-1354, (1996).
"Sensor Validation for Power Plants Using Adaptive Backpropagation Neural Network," *IEEE Transactions on Nuclear Science*, vol. 37, No. 2, by E. Eryurek et al. Apr. 1990, pp. 1040-1047.
"Smart Temperature Measurement in the '90s", by T. Kerlin et al., *C&I*, (1990).
"Software-Based Fault-Tolerant Control Design for Improved Power Plant Operation," *IEEE/IFAC Joint Symposium on Computer-Aided Control System Design*, Mar. 7-9, 1994 pp. 585-590.
A Standard Interface for Self-Validating Sensors, by M.P. Henry et al., *Report No. OUEL 1884/91*, (1991).
"Taking Full Advantage of Smart Transmitter Technology Now," by G. Orrison, *Control Engineering*, vol. 42, No. 1, Jan. 1995.
"Application of Neural Networks for Sensor Validation and Plant Monitoring," by B. Upadhyaya et al., *Nuclear Technology*, vol. 97, No. 2, Feb. 1992 pp. 170-176.
"Automated Generation of Nonlinear System Characterization for Sensor Failure Detection," by B.R. Upadhyaya et al., *ISA*, 1989 pp. 269-274.
"In Situ Calibration of Nuclear Plant Platinum Resistance Thermometers Using Johnson Noise Methods," *EPRI*, Jun. 1983.
"Johnson Noise Thermometer for High Radiation and High-Temperature Environments," by L. Oakes et al., *Fifth Symposium on Space Nuclear Power Systems*, Jan. 1988, pp. 2-23.
"Development of a Resistance Thermometer for Use Up to 1600° ", by M.J. de Groot et al., *CAL LAB*, Jul./Aug. 1996, pp. 38-41.
"Survey, Applications, And Prospects of Johnson Noise Thermometry," by T. Blalock et al., *Electrical Engineering Department*, 1981 pp. 2-11.
"Noise Thermometry for Industrial and Metrological Applications at KFA Julich," by H. Brixy et al., *7th International Symposium on Temperature*, 1992.
"Johnson Noise Power Thermometer and its Application in Process Temperature Measurement," by T.V. Blalock et al., *American Institute of Physics* 1982, pp. 1249-1259.
"Field-based Architecture is Based on Open Systems, Improves Plant Performance", by P. Cleaveland, *I&CS*, Aug. 1996, pp. 73-74.
"Tuned-Circuit Dual-Mode Johnson Noise Thermometers," by R.L. Shepard et al., Apr. 1992.
"Tuned-Circuit Johnson Noise Thermometry," by Michael Roberts et al., *7th Symposium on Space Nuclear Power Systems*, Jan. 1990.
"Smart Field Devices Provide New Process Data, Increase System Flexibility," by Mark. Boland, *I&CS*, Nov. 1994, pp. 45-51.

"Wavelet Analysis of Vibration, Part I: Theory[1]," by D.E. Newland, *Journal of Vibration and Acoustics*, vol. 116, Oct. 1994, pp. 409-416.

"Wavelet Analysis of Vibration, Part 2: Wavelet Maps," by D.E. Newland, *Journal of Vibration and Acoustics*, vol. 116, Oct. 1994, pp. 417-425.

"Development of a Long-Life, High-Reliability Remotely Operated Johnson Noise Thermometer," by R.L. Shepard et al., *ISA*, 1991, pp, 77-84.

"Application of Johnson Noise Thermometry to Space Nuclear Reactors," by M.J. Roberts et al., *Presented at the 6th Symposium on Space Nuclear Power Systems*, Jan. 9-12, 1989.

"A Decade of Progress in High Temperature Johnson Noise Thermometry," by T.V. Blalock et al., *American Institute of Physics*, 1982 pp, 1219-1223.

"Sensor and Device Diagnostics for Predictive and Proactive Maintenance", by B. Boynton, *A Paper Presented at the Electric Power Research Institute—Fossil Plant Maintenance Conference* in Baltimore, Maryland, Jul. 29-Aug. 1, 1996, pp. 50-1-50-6.

"Detection of Hot Spots in Thin Metal Films Using an Ultra Sensitive Dual Channel Noise Measurement System," by G.H. Massiha et al., *Energy and Information Technologies in the Southeast*, vol. 3 of 3, Apr. 1989, pp. 1310-1314.

"Detecting Blockage in Process Connections of Differential Pressure Transmitters", by E. Taya et al., *SICE*, 1995, pp. 1605-1608.

"Development and Application of Neural Network Algorithms For Process Diagnostics," by B.R. Upadhyaya et al., *Proceedings of the 29th Conference on Decision and Control*, 1990, pp. 3277-3282.

"A Fault-Tolerant Interface for Self-Validating Sensors", by M.P. Henry, *Colloquium*, pp. 3/1-3/2 (Nov. 1990).

"Fuzzy Logic and Neural Network Applications to Fault Diagnosis", by P. Frank et al., *International Journal of Approximate Reasoning*, (1997), pp. 68-88.

"Keynote Paper: Hardware Compilation-A New Technique for Rapid Prototyping of Digital Systems-Applied to Sensor Validation", by M.P. Henry, *Control Eng. Practice*, vol. 3, No. 7., pp. 907-924, (1995).

"The Implications of Digital Communications on Sensor Validation", by M. Henry et al., *Report No. OUEL 1912/92*. (1992).

"In-Situ Response Time Testing of Thermocouples", *ISA*, by H.M. Hashemian et al., Paper No. 89-0056, pp. 587-593, (1989).

"An Integrated Architecture For Signal Validation in Power Plants," by B.R. Upadhyaya et al., *Third IEEE International Symposium on Intelligent Control*, Aug. 24-26, 1988, pp. 1-6.

"Integration of Multiple Signal Validation Modules for Sensor Monitoring," by B. Upadhyaya et al., *Department of Nuclear Engineering*, Jul. 8, 1990, pp. 1-6.

"Intelligent Behaviour for Self-Validating Sensors", by M.P. Henry, *Advances In Measurement*, pp. 1-7, (May 1990).

"Measurement of the Temperature Fluctuation in a Resistor Generating l/F Fluctuation," by S. Hashiguchi, *Japanese Journal of Applied Physics*, vol. 22,. No. 5, Part 2, May 1983, pp. 1.284-1.286.

"Check of Semiconductor Thermal Resistance Elements by the Method of Noise Thermometry", by A. B. Kisilevskii et al., *Measurement Techniques*, vol. 25, No, 3, Mar. 1982, New York, USA, pp. 244-246.

"Neural Networks for Sensor Validation and Plant Monitoring," by B. Upadhyaya, *International Fast Reactor Safety Meeting*, Aug. 12-16, 1990, pp. 2-10.

"Neural Networks for Sensor Validation and Plantwide Monitoring," by E. Eryurek, 1992.

"A New Method of Johnson Noise Thermometry", by C.J. Borkowski et al., *Rev. Sci. Instrum.*, vol. 45, No. 2, (Feb. 1974) pp. 151-162.

"Thermocouple Continuity Checker," IBM Technical Disclosure Bulletin, vol. 20, No. 5, pp. 1954 (Oct. 1977).

"A Self-Validating Thermocouple," Janice C-Y et al., IEEE Transactions on Control Systems Technology, vol. 5, No. 2, pp. 239-253 (Mar. 1997).

*Instrument Engineers' Handbook*, Chapter IV entitled "Temperature Measurements," by T.J. Claggett, pp. 266-333 (1982).

"emWare's Releases EMIT 3,0, Allowing Manufacturers to Internet and Network Enable Devices Royalty Free," 3 pages, PR Newswire (Nov. 4, 1998).

Warrior, J., "The IEEE P1451.1 Object Model Network Independent Interfaces for Sensors and Actuators," pp. 1-14. Rosemount Inc. (1997).

Warrior, J., "The Collision Between the Web and Plant Floor Automation," 6th. WWW Conference Workshop on Embedded Web Technology, Santa Clara, CA (Apr. 7, 1997).

"Internal Statistical Quality Control for Quality Monitoring Instruments", by P. Girling et al., *ISA* 15 pgs., 1999.

"Statistical Process Control (Practice Guide Series Book)", *Instrument Society of America*, 1995, pp. 1-58 and 169-204.

"Time-Frequency Analysis of Transient Pressure Signals for a Mechanical Heart Valve Cavitation Study," *ASAIO Journal*, by Alex A. Yu et al., vol. 44, No. 5, pp. M475-M479, (Sep.-Oct. 1998).

"Caviation in Pumps, Pipes and Valves," *Process Engineering*, by Dr. Ronald Young, pp. 47 and 49 (Jan. 1990).

"Quantification of Heart Valve Cavitation Based on High Fidelity Pressure Measurements," *Advances in Bioengineering 1994*, by Laura A. Garrison et al., BED-vol. 28, pp. 297-298 (Nov. 6-11, 1994).

"Monitoring and Diagnosis of Cavitation in Pumps and Valves Using the Wigner Distribution," *Hydroaccoustic Facilities, Instrumentation, and Experimental Techniques*, NCA-vol. 10, pp. 31-36 (1991).

"Developing Predictive Models for Cavitation Erosion," *Codes and Standards in A Global Environment*. PVP-vol. 259, pp. 189-192 (1993).

"Self-Diagnosing Intelligent Motors: A Key Enabler for Next Generation Manufacturing System," by Fred M. Discenzo et al., pp. 3/1-3/4 (1999).

"A Microcomputer-Based Instrument for Applications in Platinum Resistance Thermometry," by H. Rosemary Taylor and Hector A. Navarro, Journal of Physics E. Scientific Instrument, vol. 16, No. 11, pp. 1100-1104 (1983).

"Experience in Using Estelle for the Specification and Verification of a Fieldbus Protocol:FIP," by Barretto et al., Computer Networking, pp. 295-304 (1990).

"Computer Simulation of H1 Field Bus Transmission," by Utsumi et al., Advances in Instrumentation and Control, vol. 46, Part 2, pp. 1815-1827(1991).

"Progress in Fieldbus Developments for Measuring and Control Application," by A. Schwaier, Sensor and Acuators, pp. 115-119 (1991).

"Ein Emulationssystem zur Leistungsanalyse von Feldbussystemen, Teil 1," by R. Hoyer, pp. 335-336 (1991).

"Simulatore Integrato: Confrollo su bus di campo," by Barabino et al., Automazione e Strumentazione, pp. 85-91 (Oct. 1993).

"Ein Modulares, verteiltes Diagnose-Expertensystem für die Fehlerdiagnose in lokalen Netzen," by Jürgen M. Schröder, pp. 557-565 (1990).

"Fault Diagnosis of Fieldbus Systems," by Jürgen Quade, pp. 577-581 (Oct. 1992).

"Ziele und Anwendungen von Feldbussystemen," by T. Pfeifer et al., pp. 549-557 (Oct. 1987).

"PROFIBUS Infrastructure Measures," by Tilo Pfeifer et al., pp. 416-419 (Aug. 1991).

"Simulation the Time Behaviour of Fieldbus Systems," by O. Schnelle, pp. 440-442 (1991).

"Field Bus Networks for Automation Systems Containing Intelligent Functional Unites," by W. Kriesel et al., pp. 486-489 (1987).

"Field Buses for Process Interconnection with Digital Control Systems," Tecnologia, pp. 141-147 (1990).

"Decentralised Systems with Real-Time Field Bus," Netzwerke, Jg. Nr.3 v. 14.3, 4 pages (1990).

"Process Measurement and Analysis," by Liptak et al., Instrument Engineers' Handbook, Third Edition, pp. 528-530 (1995).

"Improving Dynamic Performance of Temperature Sensors With Fuzzy Control Techniques," by Wang Lei et al., pp. 872-873 (1992).

"Microsoft Press Computer Dictionary" 2nd Edition, 1994, Microsoft.Press. p. 156.

International Search Report from Application No. PCT/US01/40791 with international filing date of May 22, 2001.

International Search Report from Application No. PCT/US01/40782 with international filing date of May 22, 2001.

International Search Report from Application No. PCT/02/14560 with international filing date of May 8, 2002.

International Search Report from Application No. PCT/US02/14934 with international filing date of May 8, 2002.

"On-Line Tool Condition Monitoring System With Wavelet Fuzzy Neural Network," by Li Xiaoli et al., pp. 271-276 (1997).

"Optimal Design of the Coils of An Electromagnetic Flow Meter," by Michalski, A. et al., IEEE Transactions on Magnetics, vol. 34, Issue 5, Part 1, pp. 2563-2566 (1998).

"Magnetic Fluid Flow Meter for Gases," Popa, N.C., IEEE Transactions on Magnetics, vol. 30, Issue 2, Part 1-2, pp. 936-938 (l993).

"New Approach to A Main Error Estimation for Primary Transducer of Electromagnetic Flow Meter," by Michalski, A., IEEE Instrumentation and Measurement Technology Conference Proceedings, vol. 2, pp, 1093-1097 (1998).

"Additional Information From Flowmeters Via Signal Analysis," by Amadi-Echendu, J.E. et al., IEEE Instrumentation and Measurement Technology Conference Record, vol, 7, pp. 187-193 (1990).

International Search Report from Application No. PCT/US02/06606 with international filing date of Mar. 5,2002.

International Search Report from Application No. PCT/US02/30465 with international filing date of Sep. 25, 2002.

"What is a weighted moving average?", *Dau Stat Refresher*, http://cne.gmu.edu/modules/dau/stat/myaygs/wma_bdy.html. (1995).

U.S. Appl. No. 10/675,014, filed Sep. 2003, Longsdorf et al.

U.S. Appl. No. 10/744,809, filed Dec. 2003, Brown et al.

"Statistics Glossary: Time Series Data", by Easton et al., http://www.stats.gla.ac.uk/steps/glossary/time_series.html, Sep. 1997.

"The Indicators Story", Sustainable Seattle, ps. 55-59, 1998.

"Detecting Regimes in Temperature Time Series", by Clemins et al., *Artificial Neural Networks in Engineering, Proceedings*, pp. 727-732, 2001.

"Re: Digital Filter-Moving Average", The Math Forumn, http://mathforum.org/discuss/sci.math/a/t/177212, Sep. 28, 1998.

U.S. Appl. No. 10/893,144, filed Jul. 2004, Brown et al.

"Notification of Transmittal of International Search Report and the Written Opinion", PCT/US2004/022736, Mar. 11, 2005.

"Notification of Transmittal of the International Search Report", PCT/US00/14798, Sep. 22, 2000.

"Notification of Transmittal of International Search Report and the Written Opinion", PCT/US2006/037535, May 11, 2007.

Official Communication from corresponding European Application No. 07839039.0-1234, dated Oct. 6, 2009.

Penalva et al., "A Supervision Support System for Industrial Processes", Oct. 1993, IEEE, p. 57-65.

\* cited by examiner

MAGNETIC FLOWMETER WITH VERIFICATION

The present application is based on and claims the benefit of U.S. provisional patent application Ser. No. 60/848,314, filed Sep. 29, 2006, the content of which is hereby incorporated by reference in its entirety.

BACKGROUND OF THE INVENTION

The present invention relates to the process measurement and control industry. More specifically, the present invention relates to magnetic flowmeters of the type used to measure flow of a process fluid.

Magnetic flow meters are used to measure flow of a conductive process fluid through a flowtube. The conductive fluid flows past an electromagnet and electrodes. In accordance with Faraday's law of electromagnetic induction, an electromotive force (EMF) is induced in the fluid due to an applied magnetic field. The EMF is proportional to the flow velocity of the fluid. The electrodes are positioned in the flowtube to make electrical contact with the flowing fluid. The electrodes sense the EMF that is magnetically induced in the fluid which can then be used to determine flow rate. The EMF is measured by the flow meter using a differential front end amplifier connected across the electrodes. The potential of the process fluid is used as a reference for the differential amplifier.

In some industrial installations, the calibration of the flowmeter must be verified to be within certain limits, for example a percent of required accuracy. Various techniques are used to verify flowmeter operation. These include shutting down the process, removing the flowtube from the process and sending the flowtube to an off site location to verify calibration. The off site location may be, for example, a factory, a certified lab or an in house location where tests are performed using additional equipment such as a "prover" or a reference meter. In some configurations, an external device can be used that is connected to the flowtube and the transmitter. This external device then verifies that the original characteristics of the flowtube and transmitter have not changed significantly. These procedures are expensive, cumbersome and require a trained technician to perform the testing.

SUMMARY

A magnetic flowmeter is provided including a magnetic flowtube arranged to receive a flow of process fluid. The magnetic flowtube includes a drive coil and at least one sense electrode. Measurement circuitry is coupled to the flowtube and is configured to provide a drive signal to the drive coil and measure flow of process fluid through the flow tube based upon an output from the sense electrode. A memory contains a stored value related to a nominal parameter of the flowtube. Verification circuitry is arranged to measure a parameter of the magnetic flowtube or flowmeter and responsively provide a verification output related to operation of the magnetic flowmeter based upon a comparison of the measured parameter and the stored value.

DETAILED DESCRIPTION

The present invention provides a method and apparatus for verifying operation of a flowtube or magnetic flowmeter with circuitry provided internal to the meter. This configuration does not require the process to be shut down and the flowtube removed from service, and does not require separate or otherwise additional equipment or trained personnel to perform the testing.

In the magnetic flowmeter, verification circuitry is provided which measures a parameter of the magnetic flowtube and/or transmitter circuitry associated with the flowmeter. The verification circuitry can be configured to measure a parameter of the flow tube including related electronic circuitry. The circuitry responsively provides a verification output based upon a comparison of the measured parameter and a stored value related to a nominal value of the parameter. The comparison can be, for example, based upon threshold limits, change over time, etc. More than one parameters can be measured and verified and the verification output may be a function of multiple comparisons or other algorithms. For example, one measurement may indicate a particular component has degraded but is still operating within acceptable limits, while another measurement may indicate a second component is also degraded and operating within acceptable limits. However, the combination of the two degraded components can be used to provide a verification that overall operation of the magnetic flowmeter is outside of an acceptable accuracy range. Examples of parameters which may be monitored include, but are not limited to, electrical resistance of a drive coil of the flowtube, electrical inductance of the drive coil, resistance of sensed electrode of the flowtube and analog output from the magnetic flowmeter, operation of front end electronics of the flowmeter, a waveform and level of the drive current applied to the coil of the flowtube, pulse output, digital inputs and outputs, or others.

Figure 1:
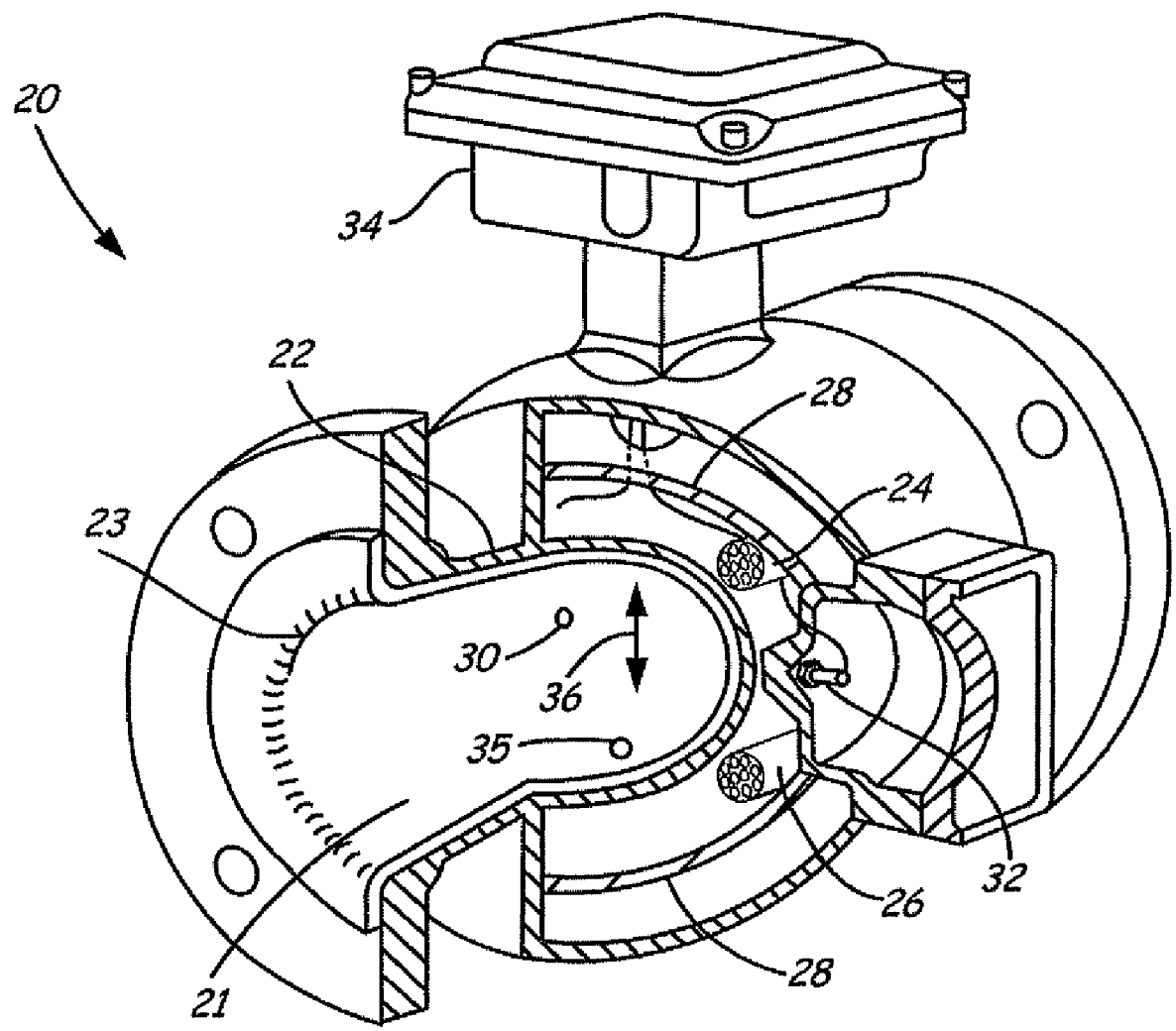
FIG. 1 is a perspective cut away view showing a partially cut away view showing a flowmeter in accordance with the present invention.

FIG. 1 is a partially cut away view of an embodiment of a magnetic flow meter in which embodiments of the present invention are useful. Magnetic flow meter 20 includes a flowtube 22 formed of low magnetic permeability material with an electrically insulating liner 23, an electromagnet 26 is formed by a coil, a ferromagnetic core or shield 28 and sense electrodes 30, 32. The electromagnet 26 and the electrodes 30, 32 are wired to a transmitter circuit 34 as is ground electrode 35. In operation, the transmitter circuit 34 drives the electromagnet 26 with an electrical current, and the electromagnet 26 produces a magnetic field 36 indicated by arrows inside the flowtube 22. Process liquid 21 flows through the magnetic field in the flowtube 22, and the flow induces an electromotive force (EMF, voltage) in the liquid 21. The insulating liner 23 prevents leakage of the EMF from the liquid 21 to the metal flowtube 22. The electrodes 30, 32 contact the liquid 21 and pick up or sense the EMF which, according to Faraday's law, is proportional to the flow rate of the liquid 21 in the flowtube 22.

Figure 2:
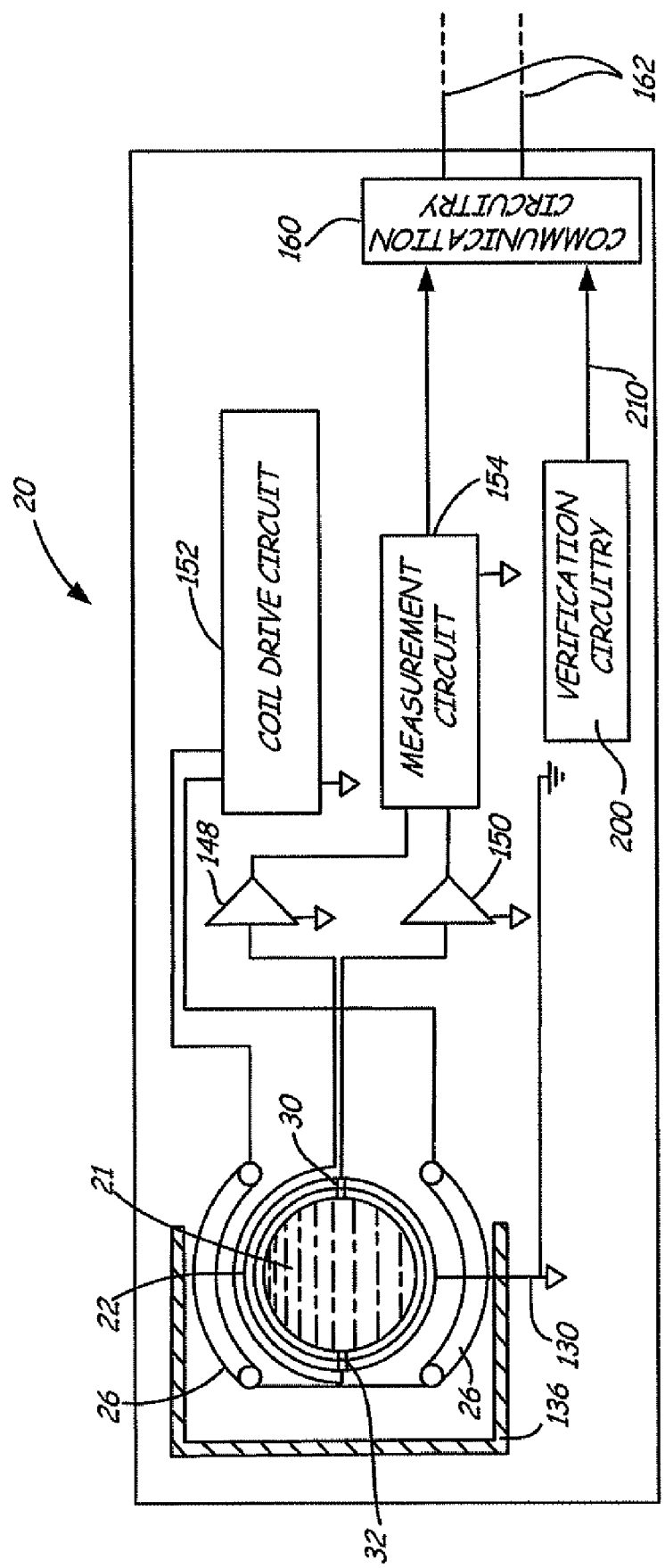
FIG. 2 is an electrical block diagram of a flowmeter of FIG. 1.

FIG. 2 is a diagrammatic view of circuitry of a magnetic flow meter 20. The magnetic flow meter 20 includes a flowtube 22 that has an insulated liner 23 adapted to carry a flowing liquid 21 that is electrically coupled to the flowtube 22 and is generally connected to earth ground 130. Electromagnets 26 are positioned to apply a magnetic field to the process fluid in response to a drive signal from drive circuitry 152. Electrodes 30 and 32 couple to measurement circuitry 154 through amplifiers 150 and 148, respectively. Measurement circuitry 154 provides an output related to flow in accordance with known techniques.

FIG. 2 also shows flowmeter verification circuitry 200 in accordance with the present invention. Operation of verification circuitry 200 will be explained in greater detail below. Verification circuitry 200 provides an output 210. This output may be provided locally for use within flowmeter 20, or sent to a remote location. Transmission to a remote location may be through any appropriate means. For example, output 210 may be carried on a two-wire process control loop operating in accordance with the HART® communication protocol, a Fieldbus protocol, or other wired communication techniques. In another example, the output 210 from verification circuitry 200 is sent using wireless communication techniques. For example, the information may be provided over a radio frequency communication link to a remote location. The remote location may be, for example, test equipment couple to the flowmeter 20, a remote control room, or other device. The output from the measurement circuitry 154 and the verification circuitry 200 is provided to communication circuitry 160. In the embodiment shown in FIG. 2, communication circuitry 160 is showing as coupling to a two-wire process control loop 162.

Figure 3:
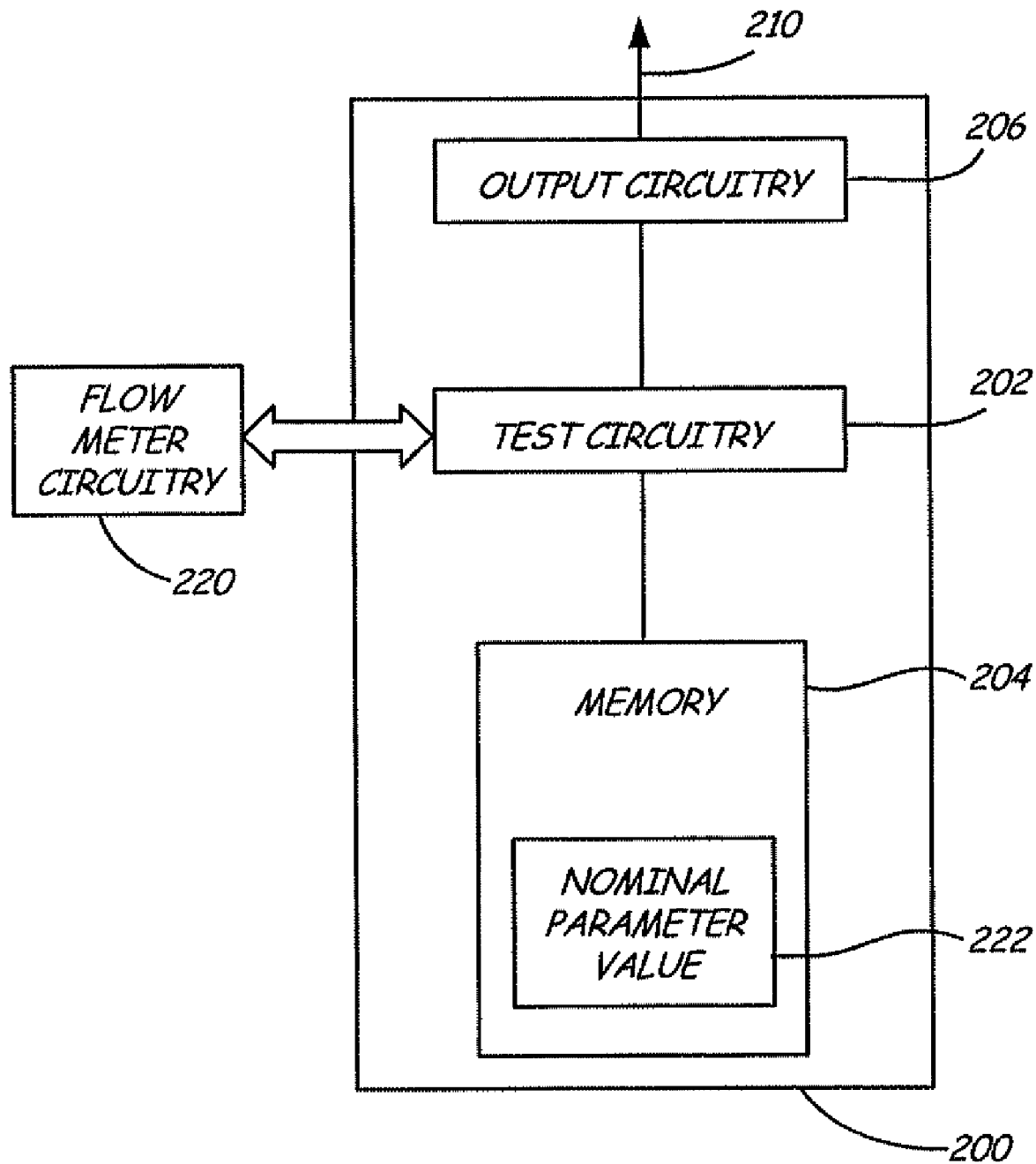
FIG. 3 is a block diagram showing verification circuitry in accordance with the present invention.

FIG. 3 is a simplified block diagram of verification circuitry 200. Verification circuitry 200 includes test circuitry 202, memory 204 and output circuitry 206. Output circuitry 206 is configured to provide the output 210. The various elements which comprise verification circuitry 200 may be embodied in other elements of flowmeter 20. For example, the memory 204 may be shared with other components of flowmeter 20. Similarly, the test circuitry 202 may be formed by discreet components, or may be shared with other components, for example a microprocessor, amplifier, analog to digital converters, sensors, etc. The output circuitry 206 may be output circuitry which is independent from other circuitry from within flowmeter 20, or may be shared with other circuitry within the flowmeter such as a microprocessor or the like.

The test circuitry 202 is shown as interfacing with flowmeter circuitry 220. Flowmeter circuitry 220 may be any of the circuitry used in flowmeter 20.

During operation, test circuitry 202 performs a test on flowmeter circuitry 220. The result of the test is compared with a nominal parameter value 222 stored in memory 204. The nominal parameter value may be a specific value, a value with a percent range, a range of values, or other way of identifying acceptable result from the test performed on the flowmeter circuitry 220. Based upon this comparison, an output is provided from verification circuitry 220 by output circuitry 206. This may be an indication that the device should be serviced soon or the device is outside of acceptable operating limits. In a more complex configuration, the memory 204 stores a plurality of nominal parameter values 222 and the test circuitry 202 performs tests on a plurality of flowmeter circuits 220 or other aspects of the flowmeter. The test circuitry 202 may then provide an output based upon the plurality of tests. For example, although a number of individual tests may be within acceptable limits in the aggregate, the tests may indicate that overall the flowmeter is not operating properly or within acceptable limits. Note that these tests are performed in situ and the flowmeter does not need to be removed from service.

Figure 4:
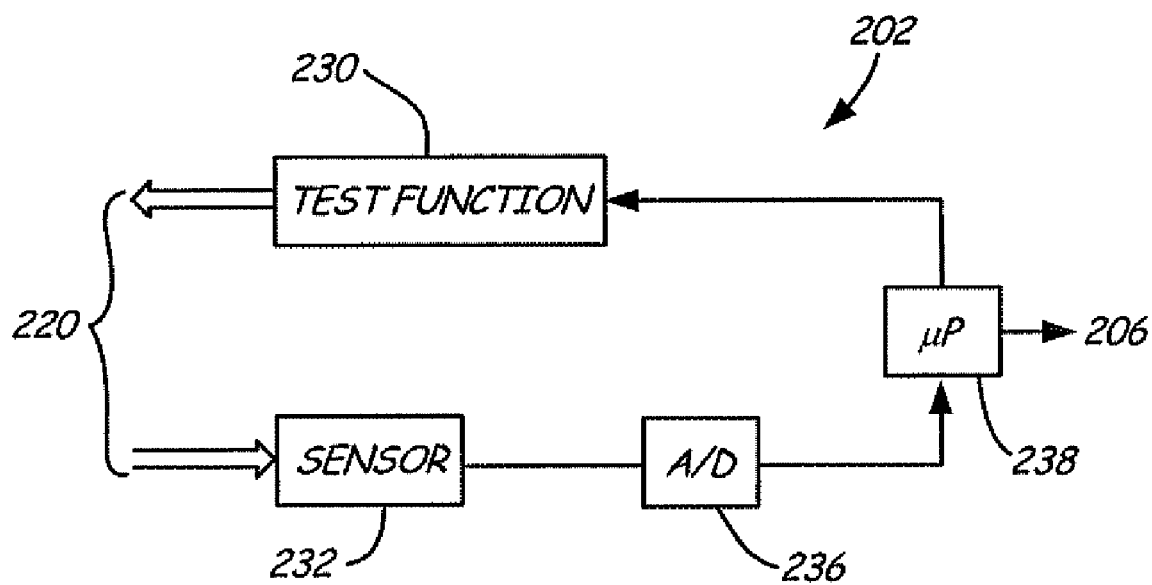
FIG. 4 is a simplified block diagram showing test circuitry used by the verification circuitry shown in FIG. 3.

FIG. 4 is a simplified block diagram showing test circuitry 202 shown in greater detail. Test circuitry 202 is illustrated as including a test function 230 and a sensor 232. Test function 230 and sensor 232 couple to flowmeter circuitry 202. The output from the sensor 232 is provided to an analog to digital converter 236 which provides a digital output signal to a microprocessor 238. The microprocessor 238 is also illustrated as controlling the test function 230. Microprocessor 238 may be a stand alone microprocessor or, for example, may be part of measurement circuitry 154 illustrated in FIG. 2. The microprocessor may operate in accordance with instructions stored, for example, in memory 204.

The test function 230 can be used to apply a test function or signal to components or circuitry of flowmeter circuitry 220. Sensor 232 may be used to measure a parameter of components or circuitry of flowmeter circuitry 220. Turning to a specific example, test function 230 may comprise a current source and sensor 232 may comprise a voltage sensor. In such a configuration, microprocessor 238 can measure a resistance value by monitoring the voltage drop across a component in response to the applied current level. Similarly, other parameters can be measured such as inductance or capacitance by using a test function which has a time varying signal.

In one configuration, the test function 230 may be provided during normal operation of the flowmeter or through existing components of the flowmeter. For example, the coil drive circuitry 152 shown in FIG. 2 can provide a test function for testing the coils 26. The test function signal may comprise the coil drive signal used during normal operation. In such a configuration, sensor 232 is used to measure a parameter of the coils, such as the time varying voltage across the coil 26 during operation.

In one example configuration, test circuitry 202 is arranged to measure the resistance of coil 26. This can be, for example, by applying a test function and measuring the resultant voltage drop or current through the coils 26. As discussed above, in another configuration, the test function is applied by coil drive circuitry 152. In another example configuration, the inductance of coil is measured. Test circuitry 202 may also be configured to measure the resistance of electrodes 202. In such a configuration, the test function 230 can be configured to apply a current through electrodes 30 and 32. In this configuration, the sensor 232 may be embodied in amplifiers 148 and 150 which are arranged to measure the voltage from electrodes 30 and 32. In addition to verifying operation of circuitry used in performing measurements, verification circuitry 200 can be configured to measure components associated with transmitter communication. For example, test circuitry 202 may be configured to measure the analog current level carried on process control loop 162. Similarly, the level of the current applied to the coil 26 by coil drive circuitry 152 may be measured using sensor 232. Other "front end" electronics of the transmitter can be tested. For example, the test function 230 can be configured to simulate an electrode voltage resulting from electrodes 30 and 32 resulting from a flow through the flowtube. Based upon the simulated sensed voltage, the input circuitry can be tested to determine proper operation of amplifiers or other components.

The nominal parameter value 222 may be stored in a non-volatile memory. The value can be placed into the memory before shipping at the factory and prior to shipping to a field location. Multiple values may be stored in the memory and which overall provide a characterization of the various components of the flowmeter 20. These values can then be compared to measured values to verify the flowtube calibration has not shifted during operation. The data may be derived in a number of way, including for example, a measurement of a factory, measurement of the external equipment and placed into the memory, measured by the verification circuitry 200 itself when the flowmeter 20 is first commissioned.

The particular test performed by test circuitry 202 may be selected as desired. For example, a pass/fail test may be employed based upon the deviation of the measured value from the value stored from the nominal parameter value 222. For example, if the analog output over process control loop 162 should be 20 mA and the measured output is within X percent of 20 mA, the particular circuitry may be indicated as operating properly.

As discussed above, any circuitry may be measured using the test circuitry 202 at appropriate measurement techniques. For example, coil resistance may be measured by the coil voltage divided by the coil current. In such a configuration, two sensor 232 may be required, one for measuring voltage and one to the rate of change in the coil current. Inductance L may be measured by solving the equation:

$$I(t) = I(\infty) - (I(\infty) - I(0)) * e^{-t/\frac{L}{R}} \quad \text{EQ. 1}$$

The electrode resistance may be measured and, for example, a common mode signal applied to the electrodes 30 and 32 and the attenuation of the signal used to determine resistance. An analog to digital converter may be used to employ to measure the current output on process control loop 162. Coil current may be measured by including a sense resistor in sensor 232 which is placed in series with the coils 26 and measuring the resultant voltage drop. Other tests may be performed on other components and the invention is not limited to those set forth herein.

With the present invention, verification of the magnetic flowmeter can be performed during normal measurement of flow of process fluid, and without interrupting the output of flow information. In one configuration, the verification is performed in the background to normal operation of the flowmeter. The verification is performed by the transmitter itself and does not require external tools. The transmitter is configured to verify the operation of both itself as well as the flowtube. The nominal parameter provides a "signature" indicative of nominal operation. The parameter can be stored during manufacturing of the flowmeter, during the initial installation of the flowmeter, or at a subsequent time. For example, the nominal parameter can be stored into the memory after the flowmeter is put into operation at a field location.

Although the present invention has been described with reference to preferred embodiments, workers skilled in the art will recognize that changes may be made in form and detail without departing from the spirit and scope of the invention.

What is claimed is:

1. A magnetic flowmeter, comprising:
   a magnetic flowtube arranged to receive a flow of process fluid, the magnetic flowtube including a drive coil and at least one sense electrode;
   measurement circuitry coupled to the flowtube configured to provide a drive signal to the drive coil and measure flow of process fluid through the flow tube based upon an output from the at least one sense electrode;
   a non-volatile memory configured to contain a plurality of stored values related to nominal parameters of the flowtube placed in the memory during manufacture of the flowmeter; and
   verification circuitry arranged to measure a plurality of parameters of the magnetic flowtube and responsively provide a verification output related to operation of the magnetic flowmeter based upon a comparison of the plurality of measured parameters and the plurality of stored values.

2. The apparatus of claim 1 wherein the measurement circuitry is configured to measure flow during operation of the verification circuitry.

3. The apparatus of claim 1 wherein the verification circuitry is configured to measure resistance of a coil of the flowtube.

4. The apparatus of claim 1 wherein the verification circuitry is configured to measure inductance of a coil of the flowtube.

5. The apparatus of claim 1 wherein the verification circuitry is configured to measure resistance of electrodes of the flowtube to process ground.

6. The apparatus of claim 1 wherein the verification circuitry is further configured to measure an output placed on a two-wire process control loop.

7. The apparatus of claim 1 wherein the verification circuitry is configured to measure a current level of current of the drive signal applied to the drive coil by the measurement circuitry.

8. The apparatus of claim 1 wherein the nominal parameter values are stored in the memory by the verification circuitry.

9. The apparatus of claim 1 wherein the nominal parameter values are selected from the group of values consisting of pulse output, digital inputs and digital outputs.

10. A method for verifying operation of a magnetic flowmeter, comprising:
    electrically coupling to a magnetic flowtube arranged to receive a flow of process fluid, the flowtube coupled to a flow of process fluid, the magnetic flowtube including a drive coil and at least one sense electrode;
    storing a plurality of nominal parameter values in a non-volatile memory during manufacture of the flowmeter;
    measuring a plurality of parameters of the magnetic flowtube;
    retrieving the stored nominal parameter values from non-volatile memory of the flowtube; and
    providing a verification output based upon a comparison of the measured parameters of the magnetic flowtube and the stored nominal parameter values.

11. The method of claim 10 wherein measuring parameters comprises measuring resistance of a coil of the flowtube.

12. The method of claim 10 wherein measuring parameters comprises measuring inductance of a coil of the flowtube.

13. The method of claim 10 wherein measuring parameters comprises measuring resistance of electrodes of the flowtube.

14. The method of claim 10 wherein measuring parameters comprises further measuring an output placed on a two-wire process control loop.

15. The method of claim 10 including measuring a current level of current of the drive signal applied to the drive coil by the measurement circuitry.

* * * * *